(12) United States Patent
Zhang

(10) Patent No.: US 10,984,135 B2
(45) Date of Patent: Apr. 20, 2021

(54) RFID INFORMATION PROCESSING

(71) Applicant: Advanced New Technologies Co., Ltd., George Town (KY)

(72) Inventor: Hong Zhang, Hangzhou (CN)

(73) Assignee: Advantageous New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/035,458

(22) Filed: Sep. 28, 2020

(65) Prior Publication Data

US 2021/0026993 A1 Jan. 28, 2021

Related U.S. Application Data

(63) Continuation of application No. 16/812,093, filed on Mar. 6, 2020, now Pat. No. 10,789,391, which is a
(Continued)

(30) Foreign Application Priority Data

Jul. 22, 2019 (CN) .......................... 201910660159.9

(51) Int. Cl.
*G06F 21/72* (2013.01)
*H04B 5/00* (2006.01)
(Continued)

(52) U.S. Cl.
CPC .......... *G06F 21/72* (2013.01); *H04B 5/0062* (2013.01); *H04L 9/30* (2013.01); *H04L 9/3247* (2013.01)

(58) Field of Classification Search
CPC ......... G06F 21/72; H04L 9/30; H04L 9/3247; H04B 5/0062
See application file for complete search history.

(56) References Cited

U.S. PATENT DOCUMENTS 7,176,784 B2 * 2/2007 Gilbert ................. G06K 7/0008
340/10.34
7,499,678 B2 3/2009 Shibagaki et al.
(Continued)

FOREIGN PATENT DOCUMENTS

CN 203405837 1/2014
CN 104680108 6/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Nam V Nguyen
(74) *Attorney, Agent, or Firm* — Fish & Richardson P.C.

(57) ABSTRACT

This disclosure relates to radio frequency identification (RFID)-based communications technologies. In one aspect, a radio-frequency-based communications apparatus includes an antenna, a near field communication (NFC) radio frequency module and an electronic product code (EPC) radio frequency module separately connected to the antenna, an NFC processing module connected to the NFC radio frequency module, and an EPC processing module connected to the EPC radio frequency module. The NFC radio frequency module and the NFC processing module are configured to process signals transmitted according to one or more predetermined NFC protocols. The EPC radio frequency module and the EPC processing module are configured to process signals transmitted according to one or more predetermined EPC protocols.

21 Claims, 6 Drawing Sheets

Related U.S. Application Data continuation of application No. PCT/CN2020/071983, filed on Jan. 14, 2020.

(51) Int. Cl.
*H04L 9/30* (2006.01)
*H04L 9/32* (2006.01)
*G08B 13/14* (2006.01)

(56) References Cited

U.S. PATENT DOCUMENTS

| | | |
|---|---|---|
| 8,026,818 B2 | 9/2011 | Cote et al. |
| 8,500,033 B2 | 8/2013 | Almond et al. |
| 8,633,821 B2 | 1/2014 | Forster |
| 8,712,334 B2 | 4/2014 | Tuttle |
| 8,766,778 B2 | 7/2014 | Brown |
| 8,941,469 B1 | 1/2015 | Diorio et al. |
| 9,048,883 B2 | 6/2015 | Chen |
| 9,077,388 B2 * | 7/2015 | Kao .................... H04B 1/0458 |
| 9,087,281 B2 | 7/2015 | Maguire et al. |
| 9,219,519 B2 * | 12/2015 | Sekine .................... H04B 1/44 |
| 9,355,398 B2 | 5/2016 | Martinez de Velasco Cortina et al. |
| 9,390,603 B2 | 7/2016 | Li et al. |
| 9,501,731 B2 * | 11/2016 | Kolman ............. G06K 19/0724 |
| 9,773,134 B2 | 9/2017 | Jones et al. |
| 10,083,385 B2 | 9/2018 | Martinez de Velasco Cortina et al. |
| 10,720,966 B1 * | 7/2020 | Zhang .................. H04B 5/0062 |
| 10,789,391 B1 * | 9/2020 | Zhang .................. H04L 9/3247 |
| 2004/0089707 A1 | 5/2004 | Cote et al. |
| 2014/0110848 A1 | 4/2014 | Balachandran et al. |
| 2015/0071441 A1 | 3/2015 | Hinz et al. |
| 2018/0182217 A1 | 6/2018 | Lamothe et al. |
| 2019/0147202 A1 | 5/2019 | Harney |

FOREIGN PATENT DOCUMENTS

| | | |
|---|---|---|
| CN | 104716441 | 6/2015 |
| CN | 106056191 | 10/2016 |
| CN | 107240157 | 10/2017 |
| CN | 108140140 | 6/2018 |
| CN | 207946839 | 10/2018 |
| CN | 108880572 | 11/2018 |
| CN | 208298223 | 12/2018 |
| CN | 110427790 | 11/2019 |
| KR | 20140134111 | 11/2014 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071983, dated Apr. 28, 2020, 14 pages (with machine translation).

* cited by examiner

RFID INFORMATION PROCESSING

CROSS-REFERENCE TO RELATED APPLICATIONS

This application is a continuation of U.S. application Ser. No. 16/812,093, filed on Mar. 6, 2020 which is a continuation of PCT Application No. PCT/CN2020/071983, filed on Jan. 14, 2020, which claims priority to Chinese Patent Application No. 201910660159.9, filed on Jul. 22, 2019, and each application is hereby incorporated by reference in its entirety.

TECHNICAL FIELD

Implementations of the present specification relate to the field of radio frequency identification (RFID)-based communications technologies.

BACKGROUND

Recently, the use of near field communication (NFC) technology is increasing. For example, NFC technology is being used for anti-counterfeit and is integrated into mobile phones for card swiping, payments, etc. NFC is developed based on RFID (radio frequency technology), and can be used to transmit signals between two objects close to each other in terms of geographic location. NFC is a short-range high-frequency radio technology, and runs in a distance of 20 centimeters (cm) at a 13.56 MHz frequency, and has low cost, high bandwidth and low energy consumption compared with RFID. Currently, NFC promotes standardization in protocol frameworks of ISO 18092, ECMA 340, ETSI TS 102 190, and is compatible with widely applied protocol standards such as ISO 14443, Type-A, ISO 15693, B, and Felica. The ISO 15693 protocol has a further communication distance than the ISO 14443 protocol, and the distance can reach 1.5 meters (m) when there is sufficient energy. Therefore, the ISO 15693 protocol has some advantages over ISO 14443. Because the ISO 14443 standard has a communication distance smaller than 10 cm, the standard has a security feature at a bank and financial level that is difficult to be attacked using a man-in-the-middle attack.

The ISO 14443 protocol is commonly used in NFC cards related to banks. Among NFC cards, an NFC card including a CPU circuit has disadvantages of high costs and high consumption compared with an NFC card including a logic circuit, and cannot support long range communication. However, an asymmetric national secret algorithm such as SM2 can run at the front, which has a higher security level. In addition, an electronic label based on an ultra-high frequency (UHF) has better advantages in terms of communication distance.

SUMMARY

Implementations of the present specification aim to provide a radio-frequency-based communication apparatuses. The apparatus includes an antenna, an NFC radio frequency module and an electronic product code (EPC) radio frequency module separately connected to the antenna, an NFC processing module connected to the NFC radio frequency module, and an EPC processing module connected to the EPC radio frequency module. The NFC radio frequency module and the NFC processing module correspond to a predetermined NFC protocol, and the EPC radio frequency module and the EPC processing module correspond to a predetermined EPC protocol.

In an implementation, the NFC radio frequency module outputs first information satisfying a first near field communication protocol based on a 13.56 MHz radio frequency signal from the antenna.

The NFC processing module includes a CPU circuit and a power control unit. The CPU circuit is connected to the NFC radio frequency module using the power control unit. The power control unit controls the CPU circuit based on an indication included in the first information, so as to suppress the CPU circuit when a communication distance of the first near field communication protocol is greater than a predetermined threshold.

In an implementation, the NFC processing module further includes a logic circuit. The logic circuit is connected to the radio frequency module using the power control unit. The power control unit further suppresses the logic circuit when the communication distance of the first near field communication protocol is smaller than the predetermined threshold.

In an implementation, the NFC radio frequency module includes a demodulator, and a first decoder and a second decoder separately connected to the demodulator. The first decoder and the second decoder respectively correspond to two near field communication protocols. The demodulator outputs a baseband signal demodulated by the demodulator to a corresponding decoder based on a protocol identifier included in the baseband signal, where a communication distance of one of the two near field communication protocols is smaller than the predetermined threshold, and a communication distance of the other near field communication protocol is greater than the predetermined threshold.

In an implementation, the EPC processing module is connected to an encryption/decryption unit included in the CPU circuit and/or an encryption/decryption unit included in the logic circuit.

In an implementation, the apparatus further includes an energy receiving module, and the energy receiving module is separately connected to the antenna, the NFC radio frequency module, and the EPC radio frequency module.

In an implementation, the apparatus further includes a storage module, the storage module is separately connected to the NFC processing module and the EPC processing module, the apparatus is an anti-counterfeit electronic label, and the storage module stores anti-counterfeit information.

Another aspect of the present specification provides an information processing method based on a communications apparatus. The communications apparatus is the previous communications apparatus, and the method includes: receiving first information from a reader/writer by using a corresponding radio frequency module in the NFC radio frequency module and the EPC radio frequency module based on a frequency of a signal sensed by the antenna; and performing information processing by using a corresponding processing module in the NFC processing module and the EPC processing module in response to the first information.

In an implementation, when the frequency of the signal sensed by the antenna is 900 MHz, the performing information processing by using a corresponding processing module in the NFC processing module and the EPC processing module includes: performing information processing by the EPC processing module by using the encryption/decryption unit to obtain second information; and the method further includes: sending the second information to the reader/writer by using the EPC radio frequency module and the antenna.

In an implementation, the apparatus further includes an energy receiving module, the energy receiving module is separately connected to the antenna, the NFC radio frequency module, and the EPC radio frequency module, and the method is performed based on energy provided by the energy receiving module.

In an implementation, the power control unit includes a first switch, the first switch is connected to the CPU circuit, and when the frequency of the signal sensed by the antenna is 13.56 MHz, the performing information processing by using a corresponding processing module in the NFC processing module and the EPC processing module in response to the first information includes: switching the first switch to a switch-off state when the communication distance of the first near field communication protocol is greater than the predetermined threshold and the first switch is in a switch-on state.

In an implementation, when the frequency of the signal sensed by the antenna is 13.56 MHz, the performing information processing by using a corresponding processing module in the NFC processing module and the EPC processing module in response to the first information includes: switching the first switch to a switch-on state when the communication distance of the first near field communication protocol is smaller than the predetermined threshold and the first switch is in a switch-off state, so that the CPU circuit performs information processing in response to the first information.

In an implementation, the power control unit includes a second switch, the second switch is connected to the logic circuit, and when the frequency of the signal sensed by the antenna is 13.56 MHz, the performing information processing by using a corresponding processing module in the NFC processing module and the EPC processing module in response to the first information further includes: switching the second switch to a switch-off state when the communication distance of the first near field communication protocol is smaller than the predetermined threshold and the second switch is in a switch-on state.

In an implementation, the second switch is switched to a switch-on state when the communication distance of the first near field communication protocol is greater than the predetermined threshold and the second switch is in a switch-off state, so that the logic circuit performs information processing in response to the first information.

In an implementation, the storage module stores anti-counterfeit data and a key, the performing, by the logic circuit, information processing in response to the first information includes: encrypting the anti-counterfeit data by the logic circuit in the NFC processing module by using the key, to obtain encrypted anti-counterfeit data as second information; and the method further includes: sending the second information to the reader/writer by using the NFC radio frequency module and the antenna.

In an implementation, the storage module further stores a private key, a public key, and a first digital signature of an authority for the public key, the first information includes a first random number, and the performing, by the CPU circuit, information processing in response to the first information includes: signing the anti-counterfeit data and the random number by the CPU circuit by using the private key to obtain a second digital signature, so as to use the anti-counterfeit data, the public key, the first digital signature, and the second digital signature as second information; and the method further includes: sending the second information to the reader/writer by using the NFC radio frequency module and the antenna.

In the RFID apparatus in the implementations of the present specification, antennas sharing 13.56 MHz are integrated to form an NFC part and a UHF part, thereby saving a chip area. An encryption module is shared, so that the UHF part reaches a higher security level. In addition, the energy receiving circuit is preposed, so that the UHF part has a further transmit distance.

BRIEF DESCRIPTION OF DRAWINGS

The implementations of the present specification are described with reference to the accompanying drawings, to make the implementations of the present specification clearer.

DESCRIPTION OF IMPLEMENTATIONS

The following describes the implementations of the present specification with reference to the accompanying drawings.

Figure 1:
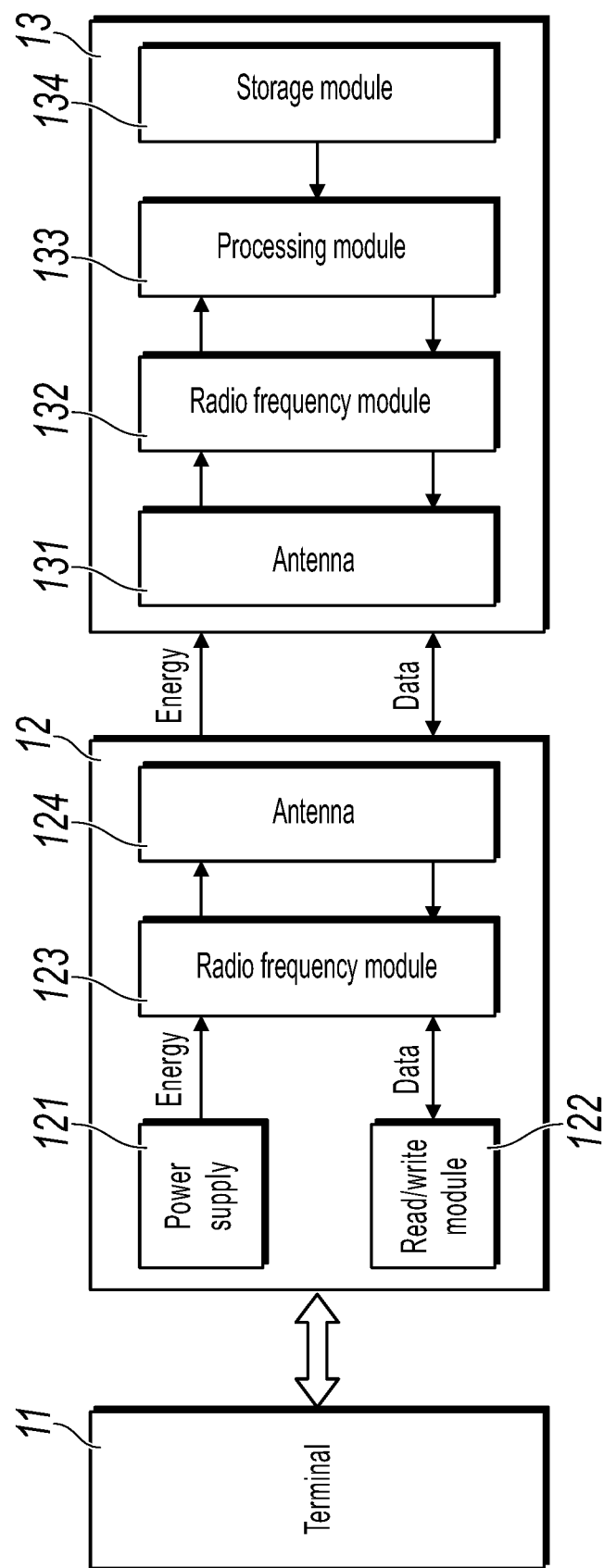
FIG. 1 is a schematic diagram illustrating an RFID system.

FIG. 1 is a schematic diagram illustrating an RFID system. As shown in FIG. 1, the system includes a terminal 11, a reader/writer 12, and an RFID apparatus 13. For example, the terminal 11 is a computing processing apparatus such as a computer or a mobile phone. The reader/writer 12 provides energy and transmits data to the RFID apparatus 13 by transmitting a radio frequency. The reader/writer 12 is a read/write apparatus used for the RFID apparatus 13, and includes a power supply 121, a read/write module 122, a radio frequency module 123, and an antenna 124. The power supply 121 provides energy to the radio frequency module 123, the read/write module 122 provides data to the radio frequency module 123, and after modulating a baseband signal, the radio frequency module 123 sends a corresponding radio frequency by using the antenna 124. The RFID apparatus 13 is, for example an RFID label, or an NFC module in a mobile phone. The RFID apparatus 13 includes an antenna 131, a radio frequency module 132, a processing module 133, and a storage module 134. After the reader/writer 12 provides energy to the RFID apparatus, the RFID apparatus 13 parses data from the received radio frequency by using the radio frequency module 132, performs data processing in the processing module 133 based on the data and data stored in the storage module 134, and sends information to the reader/writer 12 based on a processing result. After receiving the information from the RFID apparatus 13, the reader/writer 12 transmits the information to the terminal 11 for service processing.

It can be understood that the RFID system shown in FIG. 1 is merely an example, and is not used to limit the scope of the implementations of the present specification. The following describes in detail an apparatus structure of the RFID apparatus in the implementations of the present specification and an information processing method based on the RFID apparatus.

Figure 2:
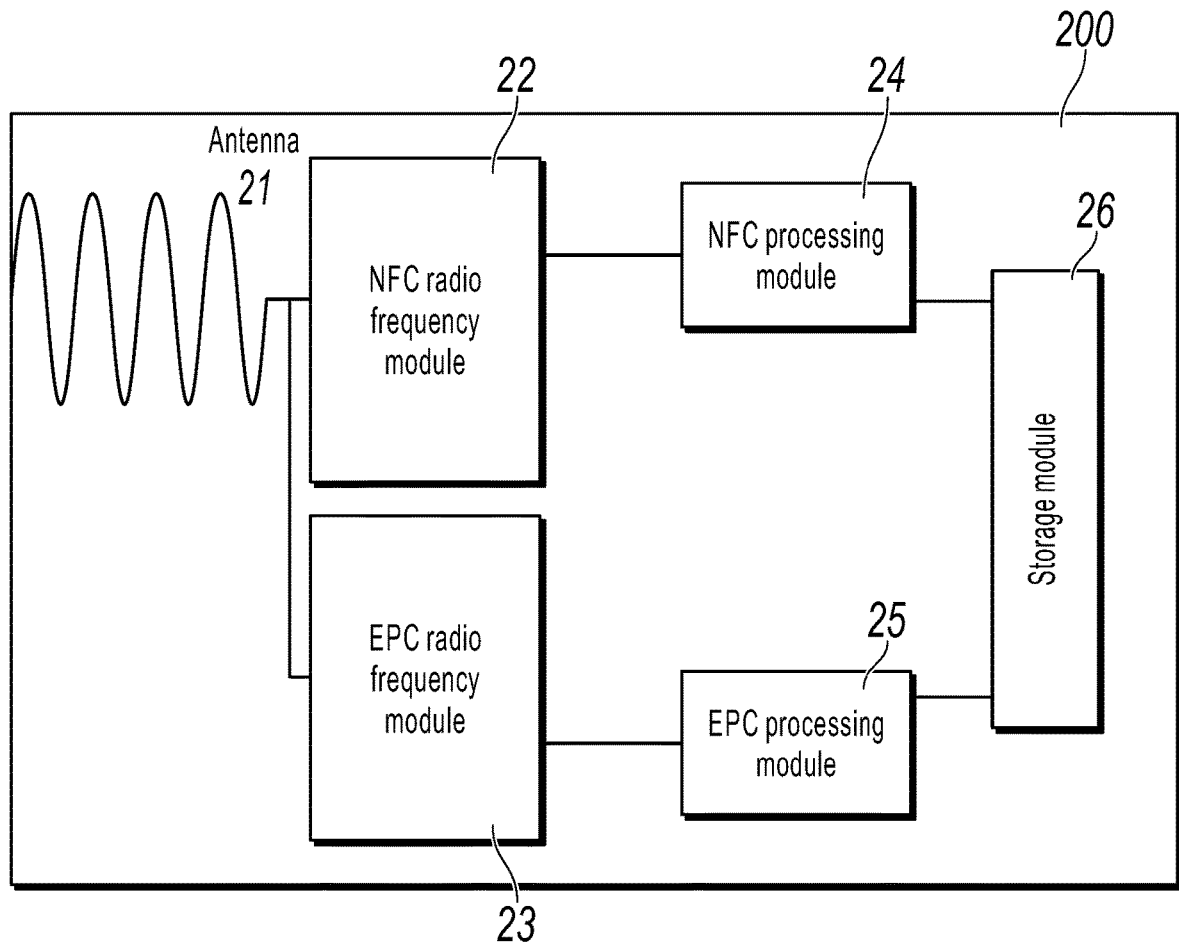
FIG. 2 shows a radio-frequency-based communications apparatus, according to an implementation of the present specification.

FIG. 2 shows a radio-frequency-based communications apparatus 200, according to an implementation of the present specification. The apparatus 200 includes an antenna 21, an NFC radio frequency module 22 and an EPC radio frequency module 23 separately connected to the antenna, an NFC processing module 24 connected to the NFC radio frequency module, an EPC processing module 25 connected to the EPC radio frequency module, and a storage module 26 separately connected to the NFC processing module and the EPC processing module. The NFC radio frequency module and the NFC processing module correspond to a predetermined NFC protocol, and the EPC radio frequency module and the EPC processing module correspond to a predetermined EPC protocol.

For example, the antenna 21 is a 13.56 MHz antenna, or another antenna that can be used to sense radio frequency signals of 13.56 MHz and 900 MHz. In the apparatus shown in FIG. 2, both the NFC radio frequency module and the EPC radio frequency module are connected to the same antenna, thereby saving costs, occupied space, etc. of a UHF antenna, and occupying a small chip area. To be specific, an NFC function and a UHF function are integrated into one chip. It has been verified by experiment that the solution is implementable.

It may be understood that the apparatus 200 shown in FIG. 2 is merely an example, but not a limitation. For example, the apparatus 200 unnecessarily includes the storage module 26 separately connected to the NFC processing module and the EPC processing module, and instead, the apparatus 200 can include two storage modules. One storage module is connected to the NFC processing module, and the other storage module is connected to the EPC processing module.

Figure 3:
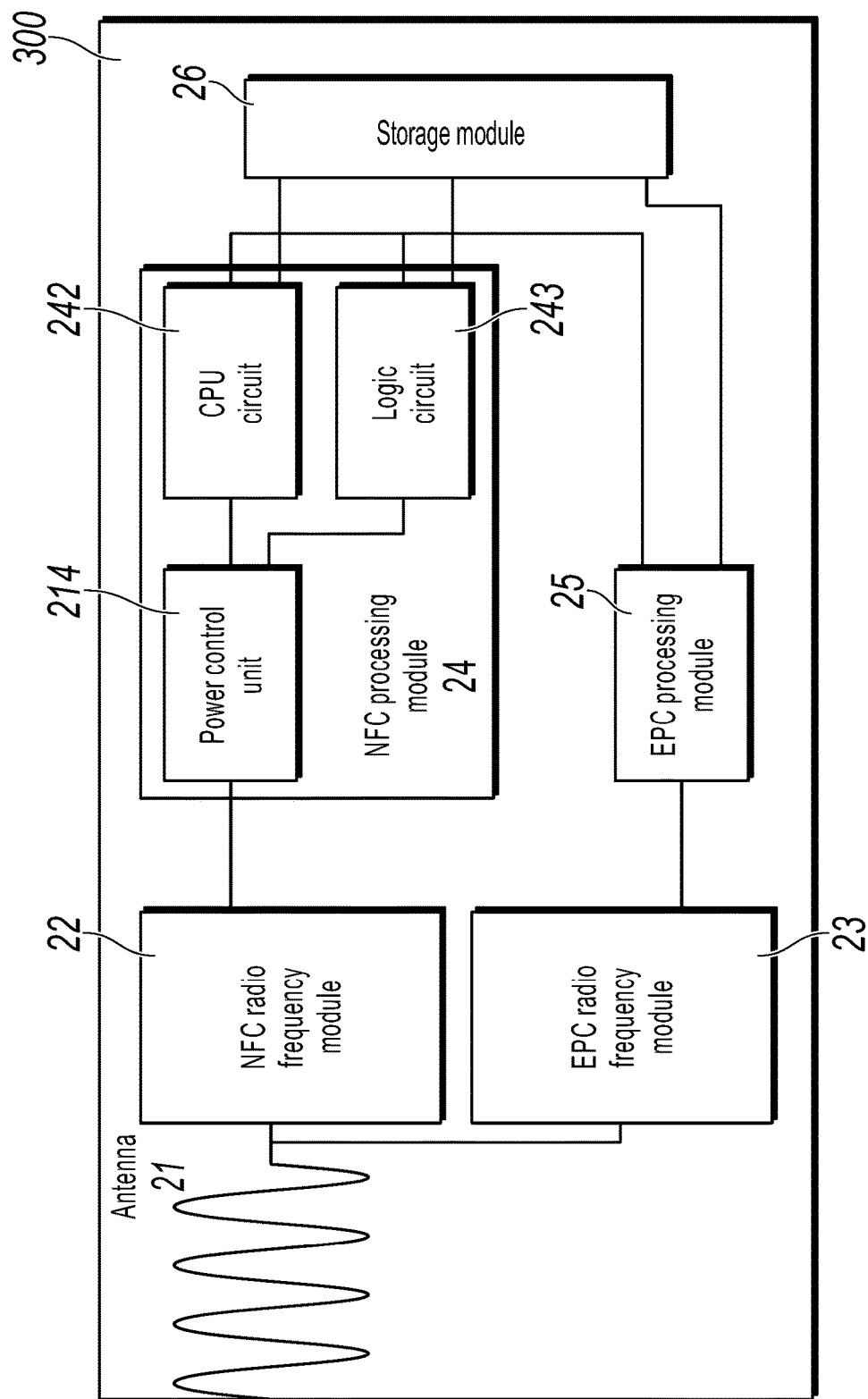
FIG. 3 shows an RFID apparatus, according to an implementation of the present specification.

In an implementation, the NFC radio frequency module can output first information satisfying a first near field communication protocol or a second near field communication protocol based on a 13.56 MHz radio frequency signal from the antenna. A communication distance of the second near field communication protocol is greater than a predetermined threshold. A communication distance of the first near field communication protocol is smaller than the predetermined threshold. For example, the predetermined threshold is 10 cm or 15 cm, etc., the first near field communication protocol is an ISO 14443A protocol or an ISO 14443B protocol, etc., and the second near field communication protocol is an ISO 15693 protocol. FIG. 3 shows an RFID apparatus 300 based on the implementation. As shown in FIG. 3, compared with FIG. 2, the NFC processing module 24 in FIG. 2 includes a power control unit 214, a CPU circuit 242, and a logic circuit 243. The CPU circuit 242 and the logic circuit 243 are separately connected to the NFC radio frequency module 22 by the power control unit 214, and the power control unit 214 controls the CPU circuit and the logic circuit based on the instructions included in the first information, so as to suppress the CPU circuit when the first information satisfies the second near field communication protocol.

Figure 4:
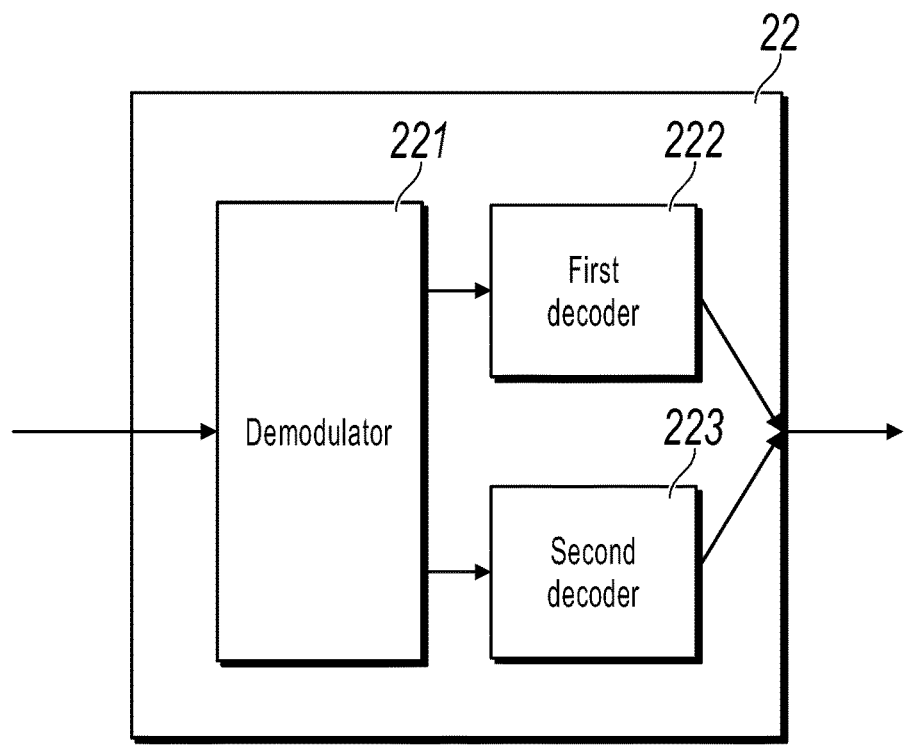
FIG. 4 shows an example structure of an NFC radio frequency module.

FIG. 4 shows an example structure of the NFC radio frequency module 22. As shown in FIG. 4, the NFC radio frequency module 22 includes a demodulator 221, a first decoder 222, and a second decoder 223. For example, the first decoder 222 corresponds to the ISO 14443A protocol, and the second decoder 223 corresponds to the ISO 15693 protocol. The demodulator 221 obtains a baseband signal after demodulating a signal sensed by the antenna. The baseband signal is usually a digital signal. For example, a signal in a predetermined period (for example, a signal in the first predetermined period) of the baseband signal is used to indicate a protocol identifier, so that a protocol corresponding to the baseband signal may be determined by reading the signal in the predetermined period of the baseband signal, and the baseband signal is output to a corresponding decoder. For example, it can be predetermined that when the signal in the first cycle is at a high level, the baseband signal corresponds to the ISO 14443A protocol, and when the signal in the first period is at a low level, the baseband signal corresponds to the ISO 15693 protocol. Therefore, the protocol corresponding to the baseband signal can be determined by reading a level in the first period, so as to output the baseband signal to the corresponding decoder. It can be understood that a structure of the radio frequency module 22 is not limited thereto. For example, it is unnecessary that only two decoders can be disposed in the radio frequency module 22, and instead, a plurality of a plurality of decoders can be disposed to correspond to different protocols. For example, the radio frequency module 22 can further include a third decoder to correspond to the ISO 14443B protocol.

It can be understood that the first near field communication protocol is not limited to the ISO 14443 protocol, and the second near field communication protocol is not limited to the ISO 15693 protocol, provided that a communication distance of the protocol satisfies a predetermined standard.

The CPU circuit 242 and the logic circuit 243 are respectively configured to process the first information satisfying the first near field communication protocol and the second near field communication protocol. In addition, the CPU circuit 242 and the logic circuit 243 are separately connected to the storage module 26. The CPU circuit 242 includes complex operation logic, and the logic circuit 243 includes simple operation logic.

In an implementation, the first information is a protocol packet satisfying a specific NFC protocol, and the protocol packet includes a protocol packet identifier, such as "15693". Therefore, after receiving the protocol packet from the NFC radio frequency module 22, the power control unit 214 can determine switch control on the CPU circuit and the logic circuit based on the protocol packet identifier in the protocol packet. In an implementation, the information from the reader/writer includes a predetermined instruction. For example, it may be predetermined that an instruction 01 corresponds to suppression of the CPU circuit. Therefore, the power control unit can perform a corresponding operation after receiving the instruction from the NFC radio frequency module 22.

Figure 5:
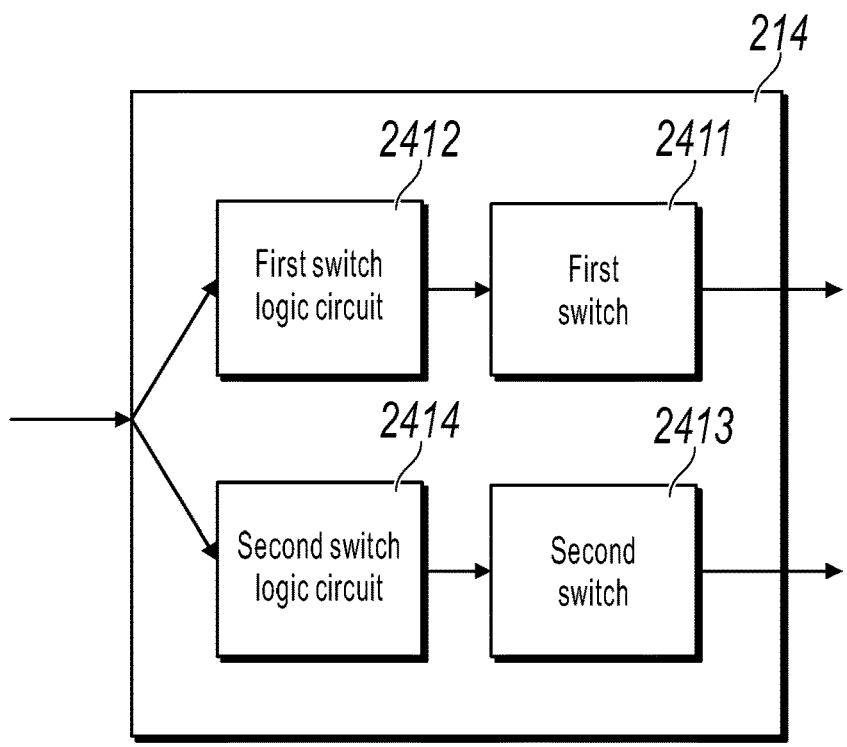
FIG. 5 shows an example structure of a power control unit.

FIG. 5 shows an example structure of the power control unit 214. As shown in the figure, the power control unit 214 includes, for example, a first switch 2411, a first switch logic circuit 2412, a second switch 2413, and a second switch logic circuit 2414. The first switch 2411 and the first switch logic circuit 2412 are connected in series between the NFC radio frequency module 22 and the CPU circuit 242, and are configured to control a power supply of the CPU circuit. The second switch 2413 and the second switch logic circuit 2414 are connected in series between the NFC radio frequency module 22 and the logic circuit 243, and are configured to control the logic circuit.

In an implementation, the first switch and the second switch are switches of two MOS transistors (metal-oxide semiconductor field-effect transistors) respectively connected to the CPU circuit and the logic circuit. In this case, the switch of the MOS transistor can be controlled by using a corresponding switch logic circuit. For example, the switch logic circuit can adjust corresponding voltage of the CPU circuit or the logic circuit based on an instruction from the reader/writer, to control the switch of the MOS transistor. For example, when the frequency of the signal sensed by the antenna is 13.56 MHz, and it is determined, based on the indication from the reader/writer, to perform communication by using the ISO 15693 protocol, the power supply of the CPU circuit can be cut off by using the switch of the MOS transistor connected to the CPU circuit. When it is determined, based on the instruction from the reader/writer, to perform communication by using the ISO 14443 (A/B) protocol, the power supply of the CPU circuit can be connected by using the MOS transistor connected to the CPU circuit, and a power supply of the logic circuit can be connected or disconnected based on a predetermined rule by using the MOS transistor connected to the logic circuit.

In an implementation, the first switch and the second switch are two clock switching switches respectively connected to the CPU circuit and the logic circuit. In this case, an input clock pulse of the clock switching switch may be controlled by using a corresponding switch logic circuit. For example, the switch logic circuit may adjust the input clock pulse of each clock switching switch based on an indication from the reader/writer, to control the clock switching switch. For example, when the frequency of the signal sensed by the antenna is 13.56 MHz, and it is determined, based on the indication from the reader/writer, to perform communication by using the ISO 15693 protocol, a clock frequency of the CPU circuit can be reduced or a clock of the CPU circuit can be turned off by using the clock switching switch connected to the CPU circuit. When it is determined, based on the indication from the reader/writer, to perform communication by using the ISO 14443 protocol, the clock frequency of the CPU circuit may be restored by using the clock switching switch connected to the CPU circuit, and a clock frequency of the logic circuit may be controlled (suppressed or not suppressed) based on a predetermine rule by using the clock switching switch connected to the logic circuit.

In an implementation, when the first information includes an indication corresponding to the ISO 14443A protocol, the clock frequency of the logic circuit is reduced or a clock of the logic circuit is turned off by using the second switch. When the first information includes an indication corresponding to the ISO 15693 protocol, the clock frequency of the logic circuit is restored by using the second switch.

It may be understood that the power control unit 214 shown in FIG. 5 is merely an example, and is not used to limit the scope of the implementations of the present specification. For example, when the CPU circuit is suppressed only during remote communication and the logic circuit is controlled during near field communication, the logic circuit does not need to be connected to the power control unit 214, but can be directly connected to the NFC radio frequency module 22 as in the existing technology. Therefore, the power control unit 214 needs to include only the first switch logic circuit 2412 and the first switch 2411 connected to the CPU circuit. To be specific, the power control unit 214 controls only the CPU circuit, so that when performing remote communication, the near field communications apparatus does not consume sensed power caused by running of the CPU circuit. As such, the near field communications apparatus has enough power for performing remote communication.

When the first near field communication protocol and the second near field communication protocol each include a plurality of protocols, and the radio frequency module 22 sends, for example, the first information satisfying the first near field communication protocol to the CPU circuit 242 by using the power control unit 214, the CPU circuit 242 selects a corresponding protocol based on a protocol identifier in the first information, to process the first information.

In an implementation, in the apparatus shown in FIG. 3, both the CPU circuit 242 and the logic circuit 243 include an encryption/decryption unit, and the EPC processing module 25 is connected to at least one of the encryption/decryption unit in the CPU circuit 242 and the encryption/decryption unit in the logic circuit 243, so that the EPC processing module 25 may share the encryption/decryption unit. As such, processing of the EPC processing module reaches a higher security level.

Figure 6:
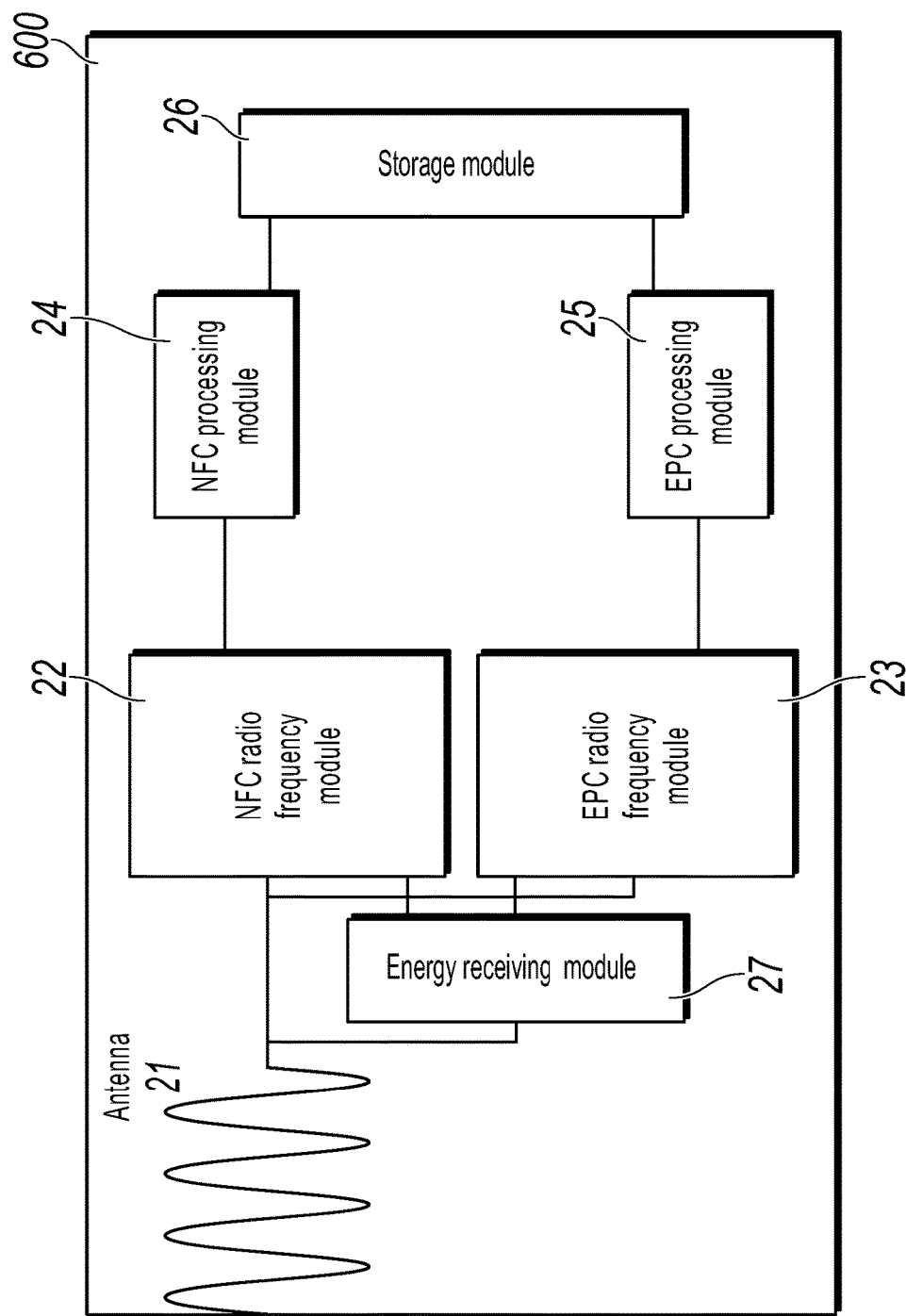
FIG. 6 shows an RFID apparatus, according to another implementation of the present specification.

FIG. 6 shows an RFID apparatus 600, according to another implementation of the present specification. Compared with the apparatus shown in FIG. 2, the apparatus 600 further includes an energy receiving module 27, and the energy receiving module 27 is separately connected to the antenna 21, the NFC radio frequency module 22, and the EPC radio frequency module 23. As shown in FIG. 6, the energy receiving module 27 is preposed, so that a UHF part can use a 13.56 MHz electromagnetic field to store energy and send/receive information. As such, the UHF part has a further communication distance.

The RFID apparatus is, for example, an anti-counterfeit electronic label, so that anti-counterfeit information is stored in the storage module 26. The electronic label integrates an NFC label and a UHF label. A specific process of prevent counterfeiting by using the anti-counterfeit label is described below in detail.

Figure 7:
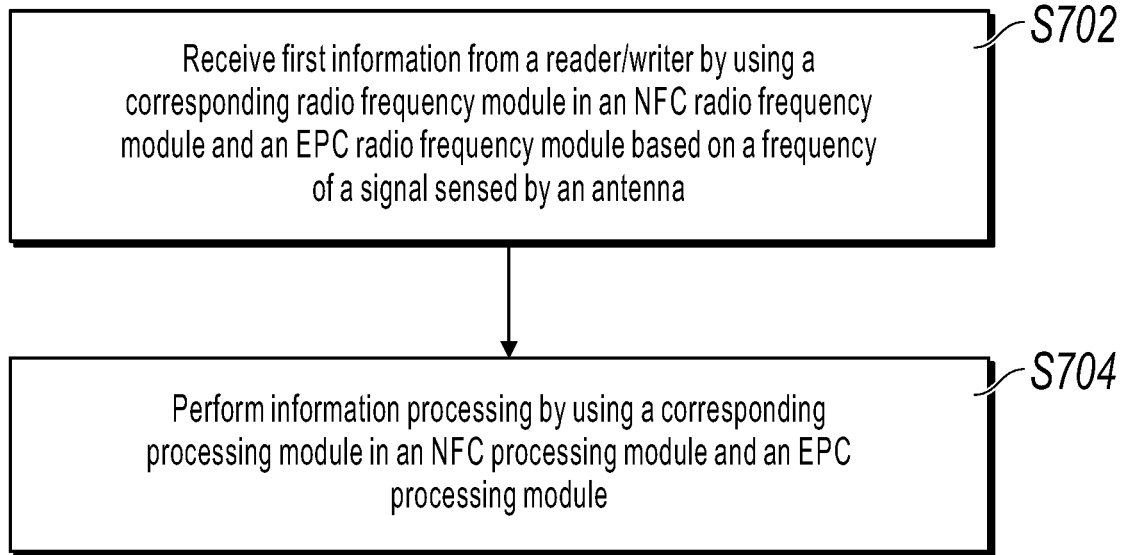
FIG. 7 is a schematic flowchart illustrating an information processing method based on a communications apparatus, according to an implementation of the present specification.

FIG. 7 is a schematic flowchart illustrating an information processing method based on a communications apparatus. The communications apparatus is the radio-frequency-based communications apparatus shown in FIG. 2, and the method includes the following steps.

Step S702: Receive first information from a reader/writer by using a corresponding radio frequency module in the NFC radio frequency module and the EPC radio frequency module based on a frequency of a signal sensed by the antenna.

Step S704: Perform information processing by using a corresponding processing module in the NFC processing module and the EPC processing module in response to the first information.

As described above, when the communications apparatus is an electronic label, the electronic label is an integrated electronic label integrating an NFC label and a UHF label. In particular, when the NFC label includes a CPU circuit and a logic circuit, the electronic label provides a plurality of functions by using the method.

First, in step S702, the first information is received from the reader/writer by using the corresponding radio frequency module in the NFC radio frequency module and the EPC radio frequency module based on the frequency of the signal sensed by the antenna.

To be specific, when the antenna senses a 13.56 MHz signal, the signal is processed by using the NFC radio frequency module to obtain a first signal. When the antenna senses a 900 MHz signal, the signal is processed by using the EPC radio frequency module to obtain a first signal. The radio frequency module converts a radio frequency sensed by the antenna into binary data as the first information. The binary data satisfies different protocol standards based on different near field communication protocols used by the reader/writer.

When the signal is processed by using the NFC radio frequency module, in an implementation, the NFC apparatus is an anti-counterfeit electronic label, the CPU circuit and the logic circuit both include a corresponding encryption/decryption unit, and the encryption/decryption units have different security levels, that is, a security level of the CPU circuit is higher than a security level of the logic circuit. In an implementation, when a reader/writer satisfying the ISO 15693 protocol is used to perform a read operation on the anti-counterfeit label, the first information sent to the label by using a radio frequency satisfies the ISO 15693 protocol, that is, the first information is a 15693 protocol packet. The protocol packet includes a protocol identifier of the 15693 protocol, and the first information further includes a read instruction. In an implementation, the first information may further include a predetermined instruction for instructing to use the logic circuit.

In an implementation, when a reader/writer satisfying the ISO 14443 protocol is used to perform a read operation on the anti-counterfeit label, the first information sent to the label by using a radio frequency satisfies the ISO 14443 protocol, that is, the first information is a 14443 protocol packet. The protocol packet includes a protocol identifier of the 14443 protocol, and the first information includes a random number used in asymmetric encryption in addition to a read instruction. In an implementation, the first information may further include a predetermined instruction for instructing to use the CPU circuit.

Step S704: Perform information processing by using a corresponding processing module in the NFC processing module and the EPC processing module in response to the first information.

When the antenna senses a 900 MHz signal, the signal is processed by using the EPC radio frequency module to obtain a first signal. The EPC radio frequency module sends the first signal to the EPC processing module, so that the EPC processing module processes the first signal. When the RFID apparatus is the apparatus shown in FIG. 3, the EPC processing module uses the encryption/decryption unit to perform information processing to obtain second information. The method further includes: sending the second information to the reader/writer by using the EPC radio frequency module and the antenna.

In an implementation, the RFID apparatus is the apparatus shown in FIG. 3, the power control unit includes a first switch, and the first switch is connected to the CPU circuit. When the frequency of the signal sensed by the antenna is 13.56 MHz, the performing information processing by using a corresponding processing module in the NFC processing module and the EPC processing module in response to the first information includes: switching the first switch to a switch-off state when the communication distance of the first near field communication protocol is greater than the predetermined threshold and the first switch is in a switch-on state; or switching the first switch to a switch-on state when the communication distance of the first near field communication protocol is smaller than the predetermined threshold and the first switch is in a switch-off state, so that the CPU circuit performs information processing in response to the first information. It can be understood that switching on and switching off the first switch are in a general sense. For example, when the first switch is a clock switching switch, switching on the first switch is providing a clock signal with a working frequency by the first switch, and switching off the first switch is providing a clock signal with a reduced working frequency or stopping providing a clock signal by the first switch.

In an implementation, the power control unit further includes a second switch, the second switch is connected to the logic circuit, and when the frequency of the signal sensed by the antenna is 13.56 MHz, the performing information processing by using a corresponding processing module in the NFC processing module and the EPC processing module in response to the first information includes: switching the second switch to a switch-off state when the communication distance of the first near field communication protocol is smaller than the predetermined threshold and the second switch is in a switch-on state; or switching the second switch to a switch-on state when the communication distance of the first near field communication protocol is greater than the predetermined threshold and the second switch is in a switch-off state, so that the logic circuit performs information processing in response to the first information.

In an implementation, the RFID apparatus is an anti-counterfeit electronic label. The storage module stores anti-counterfeit data and a key, and the CPU circuit and the logic circuit include an encryption/decryption unit. When the antenna senses a 13.56 MHz signal, and the first information includes an indication corresponding to, for example, the ISO 15693 protocol, the logic circuit encrypts the anti-counterfeit data based on control of the power control unit by using the key, to obtain encrypted anti-counterfeit data as the second information. The key is a symmetric key. For example, the key is generated inside the anti-counterfeit electronic label and registered with an authority. The method further includes: sending the second information to the reader/writer by using the NFC radio frequency module and the antenna after the second information is obtained. Therefore, after receiving the second information by using the reader/writer, a third party may invoke a key management service of the authority to verify authenticity of the second information. To be specific, the method is an online verification method.

In an implementation, the storage module further stores a private key and a first digital signature of an authority for the public key, and the first information including a first random number. When the first information includes an indication corresponding to, for example, the ISO 14443 protocol, the CPU circuit uses the private key to sign the anti-counterfeit data and the random number based on control of the power control unit to obtain a second digital signature, so as to use the anti-counterfeit data, the first digital signature, and the second digital signature as second information. The method further includes: sending the second information to the reader/writer by using the radio frequency module and the antenna. After receiving the second information by using the reader/writer, the third party can first verify the first digital signature by using the pre-obtained public key of the authority to verify authenticity of the public key in the NFC apparatus, and verify the second digital signature by using the public key in the NFC apparatus, then to verify authenticity of the anti-counterfeit data. To be specific, the method is an offline verification method.

When the frequency of the signal sensed by the antenna is 900 MHz, the EPC processing module invokes the encryption/decryption unit in the logic circuit to obtain the second information. The encryption/decryption unit encrypts the anti-counterfeit data by using the key, to obtain encrypted anti-counterfeit data as the second information.

The RFID apparatus, for example, can send the second information to the reader/writer by using a load modulation technology. When the RFID apparatus includes a power supply, the RFID apparatus can actively send the second information to the reader/writer by transmitting a radio frequency.

In an implementation, when the RFID apparatus is the apparatus shown in FIG. 6, the previous steps are performed by providing energy by the energy receiving module.

In the RFID apparatus in the implementations of the present specification, antennas sharing 13.56 MHz are integrated to form an NFC part and a UHF part, thereby saving a chip area. An encryption module is shared, so that the UHF part reaches a higher security level. In addition, the energy receiving circuit is preposed, so that the UHF part has a further transmit distance. In the NFC part, a power supply of the CPU circuit is controlled by using the power control unit based on a specific protocol, so that the CPU circuit is suppressed during remote communication, and sufficient electric energy is provided during remote communication. As such, the RFID apparatus not only can perform remote communication, but also has a high security level. Therefore, the RFID apparatus is more applicable.

It should be understood that descriptions such as "first" and "second" in the present specification are merely intended to distinguish between similar concepts for the sake of simplicity of description, and do not have another limitation function.

The implementations of the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

A person of ordinary skill in the art can be further aware that, in combination with the examples described in the implementations disclosed in the present specification, units and algorithm steps can be implemented by electronic hardware, computer software, or a combination thereof. To clearly describe interchangeability between the hardware and the software, compositions and steps of each example are generally described above based on functions. Whether the functions are performed by hardware or software depends on particular applications and design constraint conditions of the technical solutions. A person of ordinary skill in the art can use different methods to implement the described functions for each particular application, but it should not be considered that the implementation goes beyond the scope of the present application.

Steps of methods or algorithms described in the implementations disclosed in the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementations, the objective, technical solutions, and benefits of the present disclosure are further described in detail. It should be understood that the descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A radio-frequency-based communications apparatus, comprising:
   an antenna;
   a near field communication (NFC) radio frequency module and an electronic product code (EPC) radio frequency module separately connected to the antenna, wherein the NFC radio frequency module comprises:
      a demodulator; and
      a first decoder and a second decoder separately connected to the demodulator, wherein:
         the first decoder corresponds to a first NFC protocol and the second decoder corresponds to a second NFC protocol;
         the demodulator is configured to output a baseband signal demodulated by the demodulator to either the first decoder or the second decoder based on a protocol identifier included in the baseband signal; and
         a first communication distance of the first NFC protocol is less than a predetermined threshold, and a second communication distance of the second NFC protocol is greater than the predetermined threshold, wherein the NFC radio frequency module is configured to output first information satisfying an input NFC protocol that is one of the first NFC protocol or the second NFC protocol based on a radio frequency signal received from the antenna;
   an NFC processing module connected to the NFC radio frequency module, wherein the NFC processing module comprises:
      a central processing unit (CPU) circuit;
      a power control unit, wherein the CPU circuit is connected to the NFC radio frequency module using the power control unit; and
      a logic circuit connected to the NFC radio frequency module using the power control unit, wherein:
         the power control unit is configured to control the CPU circuit based on the first information,
         controlling the CPU circuit comprises suppressing the CPU circuit when a communication distance of the input NFC protocol is greater than the predetermined threshold and suppressing the logic circuit when the communication distance of the input NFC protocol is less than the predetermined threshold; and
   an EPC processing module connected to the EPC radio frequency module,
   wherein the NFC radio frequency module and the NFC processing module are configured to process signals transmitted according to one or more predetermined NFC protocols, and the EPC radio frequency module and the EPC processing module are configured to process signals transmitted according to one or more predetermined EPC protocols.

2. The radio-frequency-based communications apparatus of claim 1, wherein:
the first decoder is configured to decode signals transmitted according to the first NFC protocol; and
the second decoder is configured to decode signals transmitted according to the second NFC protocol.

3. The radio-frequency-based communications apparatus of claim 1, wherein the CPU circuit is configured to process first decoded signals output by the first decoder.

4. The radio-frequency-based communications apparatus of claim 1, wherein the logic circuit is configured to process second decoded signals output by the second decoder.

5. The radio-frequency-based communications apparatus of claim 1, wherein the EPC processing module is connected to at least one of a first encryption/decryption unit of the CPU circuit or a second encryption/decryption unit of the logic circuit.

6. The radio-frequency-based communications apparatus of claim 1, further comprising an energy receiving module, wherein the energy receiving module is separately connected to the antenna, the NFC radio frequency module, and the EPC radio frequency module.

7. The radio-frequency-based communications apparatus of claim 1, further comprising a storage module, wherein the storage module is separately connected to the NFC processing module and the EPC processing module, the radio-frequency-based communications apparatus is an anti-counterfeit electronic label, and the storage module stores anti-counterfeit information.

8. An information processing method, the method comprising:
receiving, by an antenna of a radio-frequency-based communication apparatus, an input signal having an input frequency and transmitted according to a particular communication protocol;
determining whether the input frequency is a first frequency or a second frequency different from the first frequency; and
processing the input signal, wherein processing the input signal comprises:
responsive to determining that the input frequency is the first frequency:
processing the input signal using an NFC radio frequency module and an NFC processing module of the radio-frequency-based communication apparatus, including:
demodulating, by a demodulator of the radio-frequency-based communication apparatus, the input signal to output a baseband signal to either a first decoder of a second decoder of the NFC radio frequency module, wherein the first decoder corresponds to a first NFC protocol and the second decoder corresponds to a second NFC protocol, wherein the first decoder and the second decoder are separately connected to the demodulator, and wherein a first communication distance of the first NFC protocol is less than a predetermined threshold, and a second communication distance of the second NFC protocol is greater than the predetermined threshold;
outputting, by the NFC radio frequency module, first information satisfying an input NFC protocol that is one of the first NFC protocol or the second NFC protocol based on a radio frequency signal received from the antenna;
controlling, by a power control unit of the NFC processing module, a central processing unit (CPU) circuit of the NFC processing module based on the first information, wherein the CPU circuit is connected to the NFC radio frequency module using the power control unit, and wherein controlling the CPU circuit comprises suppressing the CPU circuit when a communication distance of the input NFC protocol is greater than a predetermined threshold and suppressing a logic circuit of the NFC processing module when the communication distance of the input NFC protocol is less than the predetermined threshold, wherein the logic circuit is connected to the NFC radio frequency module using the power control unit; and
responsive to determining that the input frequency is the second frequency, processing the input signal using an electronic product code (EPC) radio frequency module and an EPC processing module of the radio-frequency-based communication apparatus, wherein the EPC processing module is connected to the EPC radio frequency module,
wherein the NFC radio frequency module and the NFC processing module are configured to process signals transmitted according to one or more predetermined NFC protocols, and the EPC radio frequency module and the EPC processing module are configured to process signals transmitted according to one or more predetermined EPC protocols, and
wherein the NFC radio frequency module and the EPC radio frequency module are separately connected to the antenna.

9. The information processing method of claim 8, further comprising:
decoding, by the first decoder, signals transmitted according to the first NFC protocol; and
decoding, by the second decoder, signals transmitted according to the second NFC protocol.

10. The information processing method of claim 8, further comprising processing, by the CPU circuit, first decoded signals output by the first decoder.

11. The information processing method of claim 8, further comprising processing, by the logic circuit, second decoded signals output by the second decoder.

12. The information processing method of claim 8, wherein the EPC processing module is connected to at least one of a first encryption/decryption unit of the CPU circuit or a second encryption/decryption unit of the logic circuit.

13. The information processing method of claim 8, wherein the radio-frequency-based communication apparatus comprises an energy receiving module, wherein the energy receiving module is separately connected to the antenna, the NFC radio frequency module, and the EPC radio frequency module.

14. The information processing method of claim 8, wherein the radio-frequency-based communication apparatus comprises a storage module, wherein the storage module is separately connected to the NFC processing module and the EPC processing module, the radio-frequency-based communications apparatus is an anti-counterfeit electronic label, and the storage module stores anti-counterfeit information.

15. A non-transitory, computer-readable medium storing one or more instructions executable by a computer system to perform operations comprising:

receiving, by an antenna of a radio-frequency-based communication apparatus, an input signal having an input frequency and transmitted according to a particular communication protocol;

determining whether the input frequency is a first frequency or a second frequency different from the first frequency; and processing the input signal, wherein processing the input signal comprises:

responsive to determining that the input frequency is the first frequency:

processing the input signal using an NFC radio frequency module and an NFC processing module of the radio-frequency-based communication apparatus, including:

demodulating, by a demodulator of the radio-frequency-based communication apparatus, the input signal to output a baseband signal to either a first decoder of a second decoder of the NFC radio frequency module, wherein the first decoder corresponds to a first NFC protocol and the second decoder corresponds to a second NFC protocol, wherein the first decoder and the second decoder are separately connected to the demodulator, and wherein a first communication distance of the first NFC protocol is less than a predetermined threshold, and a second communication distance of the second NFC protocol is greater than the predetermined threshold;

outputting, by the NFC radio frequency module, first information satisfying an input NFC protocol that is one of the first NFC protocol or the second NFC protocol based on a radio frequency signal received from the antenna;

controlling, by a power control unit of the NFC processing module, a central processing unit (CPU) circuit of the NFC processing module based on the first information, wherein the CPU circuit is connected to the NFC radio frequency module using the power control unit, and wherein controlling the CPU circuit comprises suppressing the CPU circuit when a communication distance of the input NFC protocol is greater than a predetermined threshold and suppressing a logic circuit of the NFC processing module when the communication distance of the input NFC protocol is less than the predetermined threshold, wherein the logic circuit is connected to the NFC radio frequency module using the power control unit; and responsive to determining that the input frequency is the second frequency, processing the input signal using an electronic product code (EPC) radio frequency module and an EPC processing module of the radio-frequency-based communication apparatus, wherein the EPC processing module is connected to the EPC radio frequency module, wherein the NFC radio frequency module and the NFC processing module are configured to process signals transmitted according to one or more predetermined NFC protocols, and the EPC radio frequency module and the EPC processing module are configured to process signals transmitted according to one or more predetermined EPC protocols, and wherein the NFC radio frequency module and the EPC radio frequency module are separately connected to the antenna.

16. The non-transitory, computer-readable medium of claim 15, wherein the operations comprise:

decoding, by the first decoder, signals transmitted according to the first NFC protocol; and decoding, by the second decoder, signals transmitted according to the second NFC protocol.

17. The non-transitory, computer-readable medium of claim 15, wherein the operations comprise processing, by the CPU circuit, first decoded signals output by the first decoder.

18. The non-transitory, computer-readable medium of claim 15, wherein the operations comprise processing, by the logic circuit, second decoded signals output by the second decoder.

19. The non-transitory, computer-readable medium of claim 15, wherein the EPC processing module is connected to at least one of a first encryption/decryption unit of the CPU circuit or a second encryption/decryption unit of the logic circuit.

20. The non-transitory, computer-readable medium of claim 15, wherein the radio-frequency-based communication apparatus comprises an energy receiving module, wherein the energy receiving module is separately connected to the antenna, the NFC radio frequency module, and the EPC radio frequency module.

21. The non-transitory, computer-readable medium of claim 15, wherein the radio-frequency-based communication apparatus comprises a storage module, wherein the storage module is separately connected to the NFC processing module and the EPC processing module, the radio-frequency-based communications apparatus is an anti-counterfeit electronic label, and the storage module stores anti-counterfeit information.

* * * * *

UNITED STATES PATENT AND TRADEMARK OFFICE
CERTIFICATE OF CORRECTION

PATENT NO. : 10,984,135 B2
APPLICATION NO. : 17/035458
DATED : April 20, 2021
INVENTOR(S) : Hong Zhang Page 1 of 1

It is certified that error appears in the above-identified patent and that said Letters Patent is hereby corrected as shown below:

On the Title Page

Column 1, (73) Assignee, Line 1, replace "Advantageous New Technologies Co., Ltd." with -- Advanced New Technologies Co., Ltd. --.

In the Claims

In Column 14, Line 12, Claim 8, replace "a" with -- the, therefor --.

In Column 15, Line 29, Claim 15, replace "a" with -- the, therefor --.

Signed and Sealed this
Ninth Day of January, 2024

Katherine Kelly Vidal
*Director of the United States Patent and Trademark Office*